(12) United States Patent
Loader

(10) Patent No.: US 9,483,658 B2
(45) Date of Patent: Nov. 1, 2016

(54) DISPLAY DEVICE

(71) Applicant: Barclays Bank PLC, London (GB)

(72) Inventor: Malcolm Stephen Loader, Lightwater Surrey (GB)

(73) Assignee: BARCLAYS BANK PLC, London (GB)

( * ) Notice: Subject to any disclaimer, the term of this patent is extended or adjusted under 35 U.S.C. 154(b) by 0 days.

(21) Appl. No.: 14/422,156

(22) PCT Filed: Aug. 14, 2013

(86) PCT No.: PCT/GB2013/052157
§ 371 (c)(1),
(2) Date: Feb. 17, 2015

(87) PCT Pub. No.: WO2014/027195
PCT Pub. Date: Feb. 20, 2014

(65) Prior Publication Data
US 2015/0242651 A1 Aug. 27, 2015

(30) Foreign Application Priority Data
Aug. 15, 2012 (GB) .................................. 1214572.8

(51) Int. Cl.
| | | |
|---|---|---|
| G06F 7/04 | (2006.01) |
| G06F 21/62 | (2013.01) |
| G06F 9/44 | (2006.01) |
| G06F 21/60 | (2013.01) |
| G06F 3/0488 | (2013.01) |
| G06F 3/041 | (2006.01) |
| G06F 3/0482 | (2013.01) |
| G06F 3/0484 | (2013.01) |

(52) U.S. Cl.
CPC ........... *G06F 21/6245* (2013.01); *G06F 3/041* (2013.01); *G06F 3/0482* (2013.01); *G06F 3/0488* (2013.01); *G06F 3/04842* (2013.01); *G06F 3/04886* (2013.01); *G06F 9/4443* (2013.01); *G06F 21/60* (2013.01)

(58) Field of Classification Search
USPC ........................................................ 726/27
See application file for complete search history.

(56) References Cited

U.S. PATENT DOCUMENTS

| | | | | |
|---|---|---|---|---|
| 7,779,475 B2* | 8/2010 | Jakobson | ................ | G06F 21/62 726/26 |
| 2004/0193910 A1* | 9/2004 | Moles | ..................... | G06F 21/84 726/27 |
| 2007/0006316 A1* | 1/2007 | Veselova | ............. | G06F 21/6245 726/26 |
| 2013/0215044 A1* | 8/2013 | Ahn | ....................... | G06F 3/0482 345/173 |
| 2013/0321267 A1* | 12/2013 | Bhatti | ................... | G06F 3/0237 345/157 |

OTHER PUBLICATIONS

The above references were cited in an International Search Report issued on Dec. 2, 2013, that issued in the corresponding International Application No. PCT/GB2013/052157.

* cited by examiner

*Primary Examiner* — Brandon Hoffman
(74) *Attorney, Agent, or Firm* — Cowan, Liebowitz & Latman, P.C.; Steven D. Underwood

(57) ABSTRACT

A method of operating a display device, such as a tablet device, comprises displaying a plurality of covers corresponding to respective different data items, such as financial information, and selecting at least one cover and displaying the corresponding data item or data items.

16 Claims, 19 Drawing Sheets

Bank Account

12 Apr-11 May 2011

Mr A Sample
- Statement date 11 May 2011
- Last statement 11 Apr 2011
- Sort code 00-00-00
- Account no. 00000000
- SWIFTBIC 00000000
- IBAN 0000 0000 0000 0000

At a glance
Start balance £1977.13
Money in £355.32
Money out £1341.59
End balance £990.86

Agreed limits
- Overdraft limit £150
- Personal Reserve limit £400

Sort code 00-00-00 - Account number 00000000

Your transactions

| Date | Description | Money Out | Money In | Balance |
|---|---|---|---|---|
| 24 Apr | Direct debit to TV Company | 19.50 | | 1,395.69 |
| 25 Apr | Card Payment to Post UK Ref: ABCD0000 | 2.50 | | 1,393.19 |
| | Online transfer to savings account Ref: 123465789 | 100.00 | | 1,293.19 |
| | Direct Debit to Gym membership Ref: 123465789 | 32.50 | | 1,260.69 |
| 27 Apr | Card payment to Petrol Station | 22.50 | | 1,238.19 |
| 29 Apr | Online payment to Credit Card Ref: 111122223334444 | 5.99 | | 1,232.20 |
| 30 Apr | Card payment Garden Center Ref: BAR456000 | 13.99 | | 1,213.21 |
| 2 May | Card payment to Clothes Mart | 2.50 | | 1,215.71 |
| 3 May | Card payment to Pub Ref: 00009876 | 12.35 | | 1,203.36 |
| 5 May | Card payment to Pharmacy | 12.62 | | 1,190.74 |
| | Card payment to Supermarket | 22.30 | | 1,168.44 |
| 7 May | End balance | | | 1,068.44 |

DISPLAY DEVICE

The invention relates to a display device, a method of using and operating a display device, and the user interface of a display device or computing device. The invention especially relates to a mobile computing device such as a tablet. The invention is especially concerned with mobile banking, but is relevant to other applications involving sensitive information.

Mobile computing devices are well known. A problem with using a mobile computing device in a public location, such as on a train, is that information displayed on the device can be seen by others. This is especially a problem with devices with relatively large screens, such as tablets, and where sensitive information, such as bank account information, such as statements, is displayed.

In the field of online banking, it is known to display further information when the user hovers their mouse pointer over a transaction, see for example: http://www.rbs.co.uk/personal/your-statement.ashx# (see Payments made using your debit card in a shop), which states: 'More information—the last four digits of your card number, the date of the transaction and the name of the retailer—is shown in your full statement within the service. You can also see more information on the Account Summary page as a tool tip when you hover your mouse over the transaction.'

Aspects of the invention are set out in the accompanying claims.

The invention provides a method of operating or controlling a display device comprising displaying a plurality of covers corresponding to respective different data items, the method comprising displaying the corresponding data item or data items, in response to selection of the at least one respective cover, for example, by a user selecting a cover, for example, by touching a cover on the screen.

The invention also provides a method of operating or controlling a display device comprising displaying on a display device a plurality of covers representing data items in a plurality of different categories, for example, in a predetermined array, and/or a of plurality of data items in a plurality of different categories, preferably in a predetermined array, wherein data items, or data items in different categories, are selectively hidden or revealed (covered or uncovered) using the covers in response to selection, for example, by a user selecting a cover, for example, by touching a cover on the screen.

The invention also provides a corresponding display device, or apparatus, and computer program arranged to operate the method or such a display device or apparatus.

The invention relates to a method and apparatus for selectively revealing sensitive information on a tablet. The invention provides a interaction pattern for selectively revealing sensitive information on tablet devices, and more specifically to an interaction patterns that allows users to mask information and selectively reveal it, either at an individual data item level, or at a data category level.

Data items are displayed replaced (or concealed, masked or hidden) by covers, and the respective data items are displayed only on selection. The covers, either by markings, or labels, or location (such as location in a headed table or array) can indicate the type of data item covered, but do not include details of the data item. Each cover is preferably essentially the same size and shape as the respective covered data item, as displayed without the cover, or as displayed, for example, superimposed on or in relation to a cover. If a data item is selected and displayed, only the selected data item or items is or are displayed, and other data items remain covered. Thus, display is selective and partial. The other covers continue to be displayed.

Preferably, the display of data items defaults to "covered", and selected data items or categories of data items are displayed. Alternatively, data items can initially be displayed, and selected data items or categories or data items can be selected to be covered. The covered data items can then subsequently be selectively displayed.

When there are a plurality of data items to be displayed, these are displayed as a plurality of covers, and when a cover is selected and the corresponding data item is displayed, the remaining data items are not displayed, but remain covered. In other words, only the selected data item is displayed, and the remaining data items are not displayed, or are displayed in the form of or represented by their respective covers. Similarly, if a plurality of data items are selected for display, only the selected data items are displayed. The remaining data items are not revealed. The remaining data items remain displayed as covers. In other words, there is partial display of information, that is, display of only the selection information of data items. The selected information is revealed, and the remaining information remains concealed and covered.

As a result of the invention, the display of possibly sensitive information can be controlled, so that the user can see the information while concealing the information from others. The user can choose to display certain categories of information, for example, that is less sensitive, and/or to improve ease of use, for example, making it easier to browse.

By defaulting to displaying information in the form of covers, information is not displayed until desired by the user. Accordingly, information is not displayed to others. Information can be displayed on selection by the user, so display is controlled by the user. The user can choose partial display, thereby limiting the information that can be viewed, for example, by others, and also the size of information being viewed, thereby reducing the risk of information being viewed by others. By choosing how and where the information is displayed, the information can be shielded by the user, for example, using the hand that selects the information.

Embodiments of the invention will be described with reference to the accompanying drawings, of which:

FIGS. 1 to 18 show a tablet according to an embodiment of the invention, with different displays.

FIG. 1 shows a tablet device 1 including a touch screen 3, which is a display for displaying information and also a sensor for sensing contact at different locations across the screen. Contact may be, for example, by digits, usually one or more fingers, or by a contact device such as a stylus.

Figure 19:
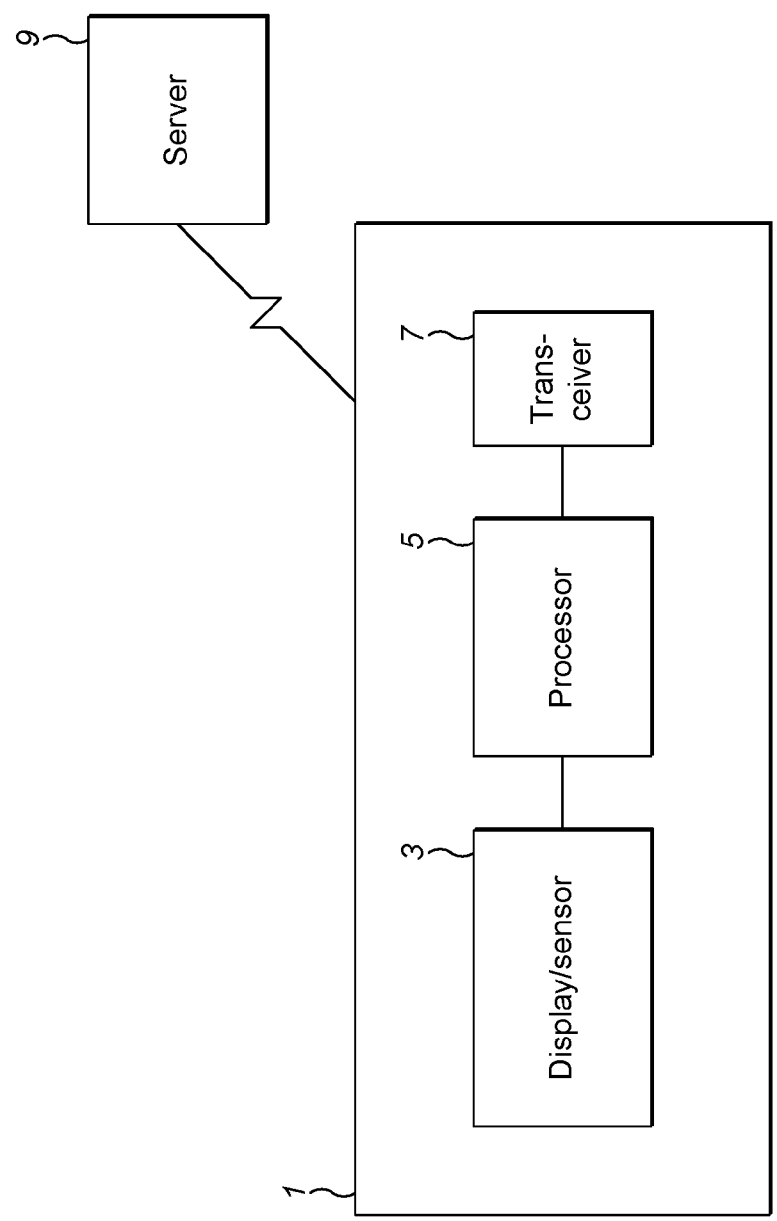
FIG. 19 is a block diagram of a device and network according to an embodiment of the invention.

As represented in FIG. 19, the display and sensor 3 are connected to a processor 5, for processing instructions. The processor is connected to transceiver 7 for transmitting and receiving information. In the embodiment, the transceiver 7 transmits and receives information wirelessly, across a wi-fi or mobile phone network. In the embodiment, information is transmitted to and received from a remote server 9, in a bank.

In FIG. 1, the device displays an account statement. The displayed account statement includes displays of data items 11 in the form of details of transactions including date, description, amount and balance, and other information such as a summary of account details, and a summary of the account statement.

The display of the tablet device has a touch screen 3 that is relatively large. Thus, displayed information may be easily visible to others. The user may wish to keep sensitive information such as account information private and hidden from others.

FIG. 1 also shows a menu button 13 in the bottom right hand corner of the display.

Figure 2:
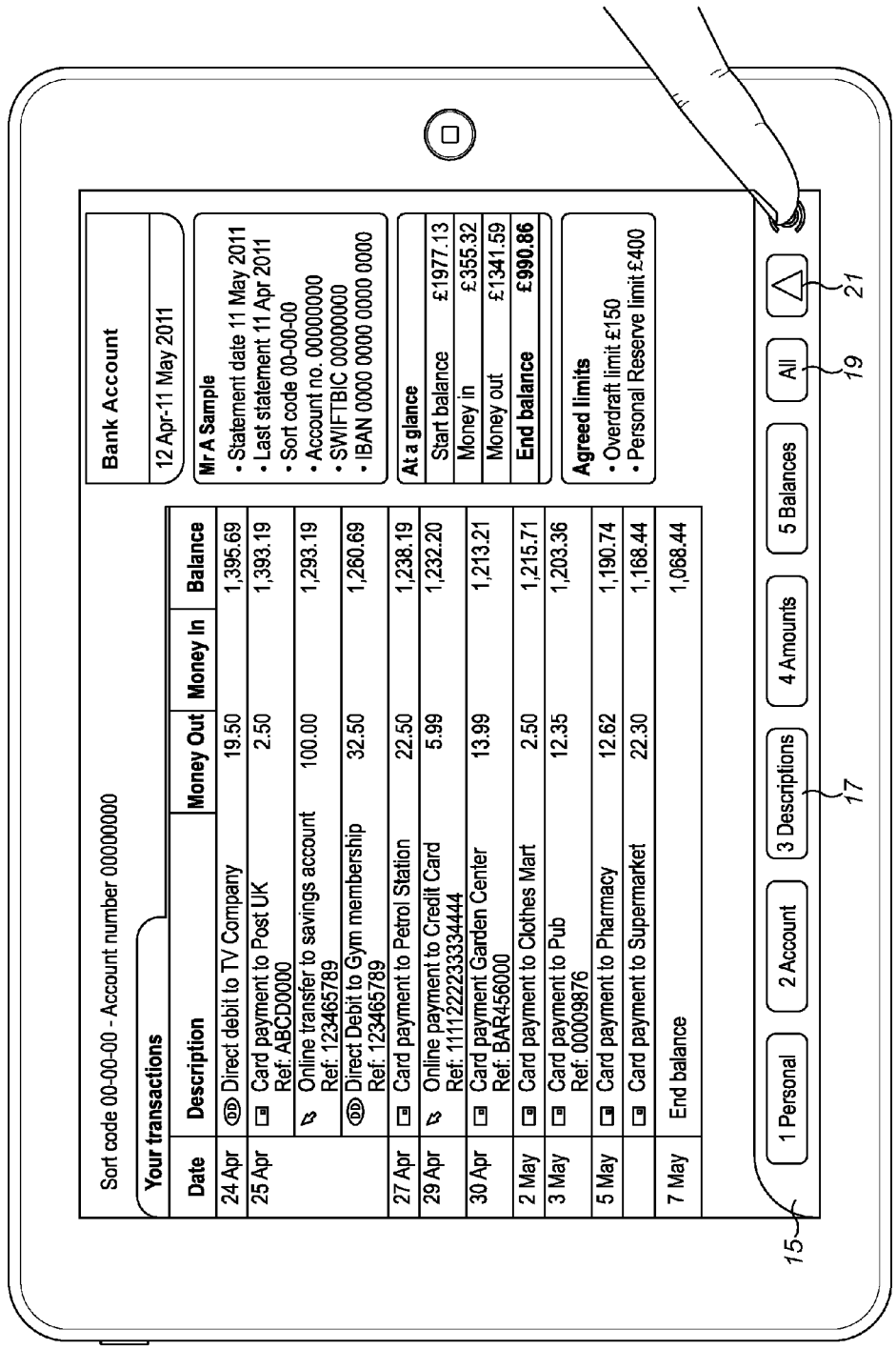

FIG. 2 corresponds to FIG. 1, but with the menu button selected, and a menu bar 15 displayed. The menu bar includes category buttons 17 for numbered categories, in particular: 1 Personal; 2 Account 3 Descriptions; 4 Amounts and 5 Balances, corresponding to categories of data items, an "All" button, and an options button 19, indicated by an arrow, discussed in more detail below.

As shown in FIG. 2, all the category buttons are "deselected", as indicated by a dark border.

Figure 3:
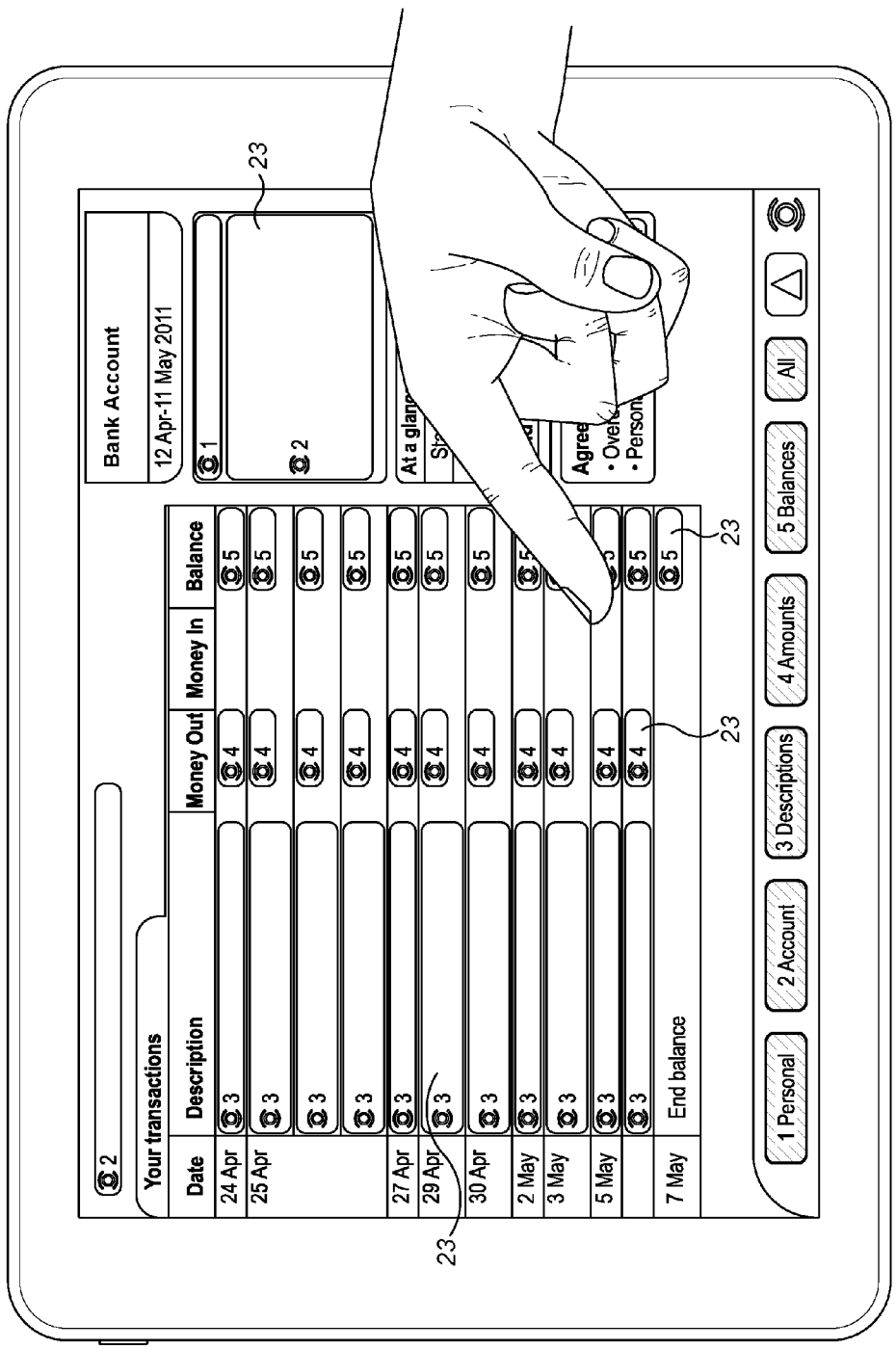

FIG. 3 shows a display in which certain displayed data items in the form of account information are replaced (that is, masked, hidden or covered) by covers 23. In particular, for each transaction, each of the description, money in or money out, and balance is covered by a respective cover. Account details and account summary also have respective covers.

The covers correspond in size and location to the respective hidden data items. The covers also include a label in the form of a number indicating the category of hidden data item, as described in more detail below.

Other information, such as headings and logos remained displayed uncovered. Thus, the display includes display includes displayed information and hidden information.

In FIG. 3, all the categories of data items available to be covered are covered. In other words, the display in FIG. 3 corresponds to the selection of the "All" button 19, or selection of all of the category buttons 17. As shown in FIG. 3, the "All" button 19 and each of the category buttons 17 are shown as selected, indicated by a light border.

Figure 4:
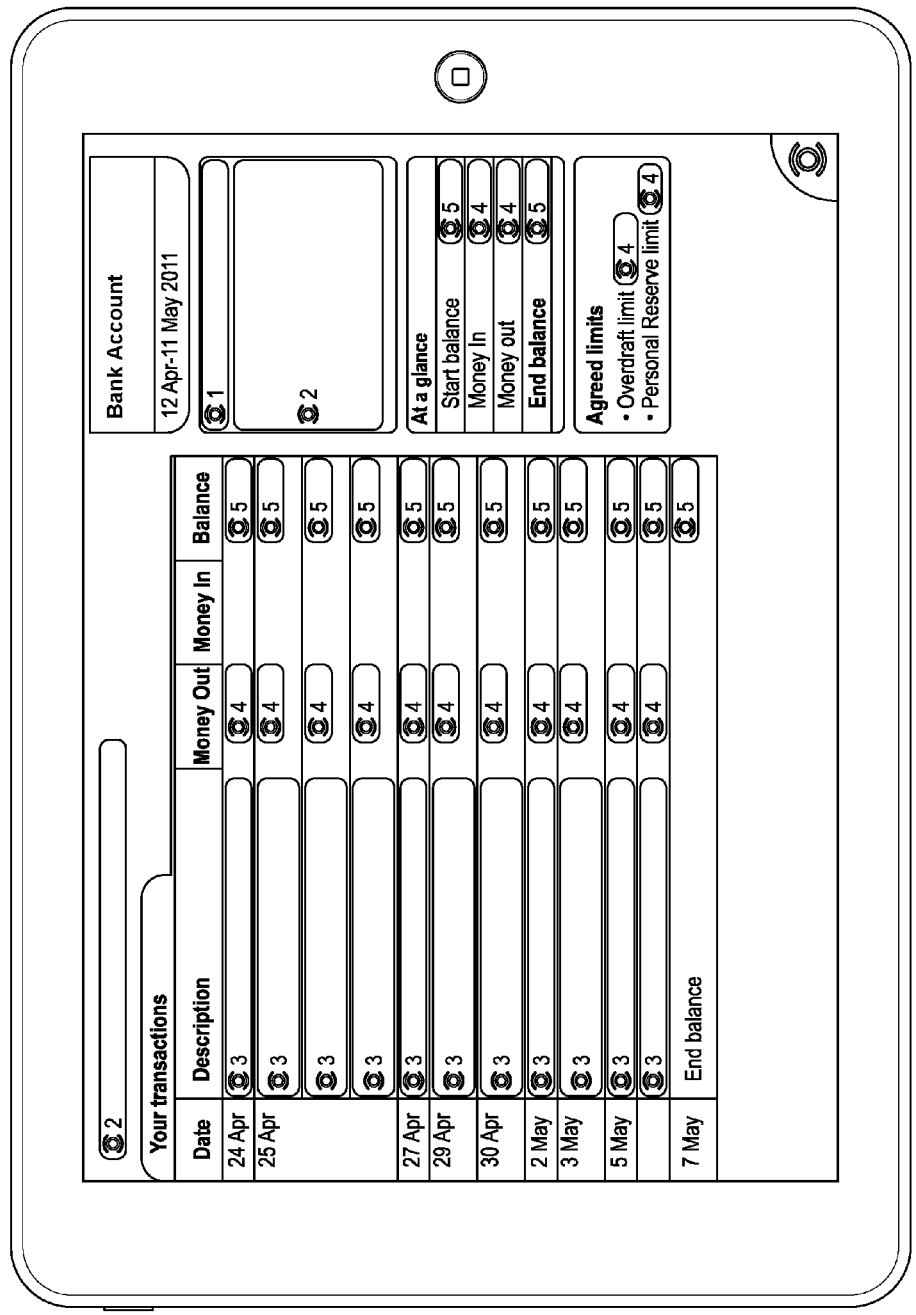

The display of FIG. 4 corresponds to the display of FIG. 3 with the menu bar hidden and replaced by the menu button in the bottom right hand corner, achieved by selection of the menu button when the menu bar is displayed.

Figure 5:
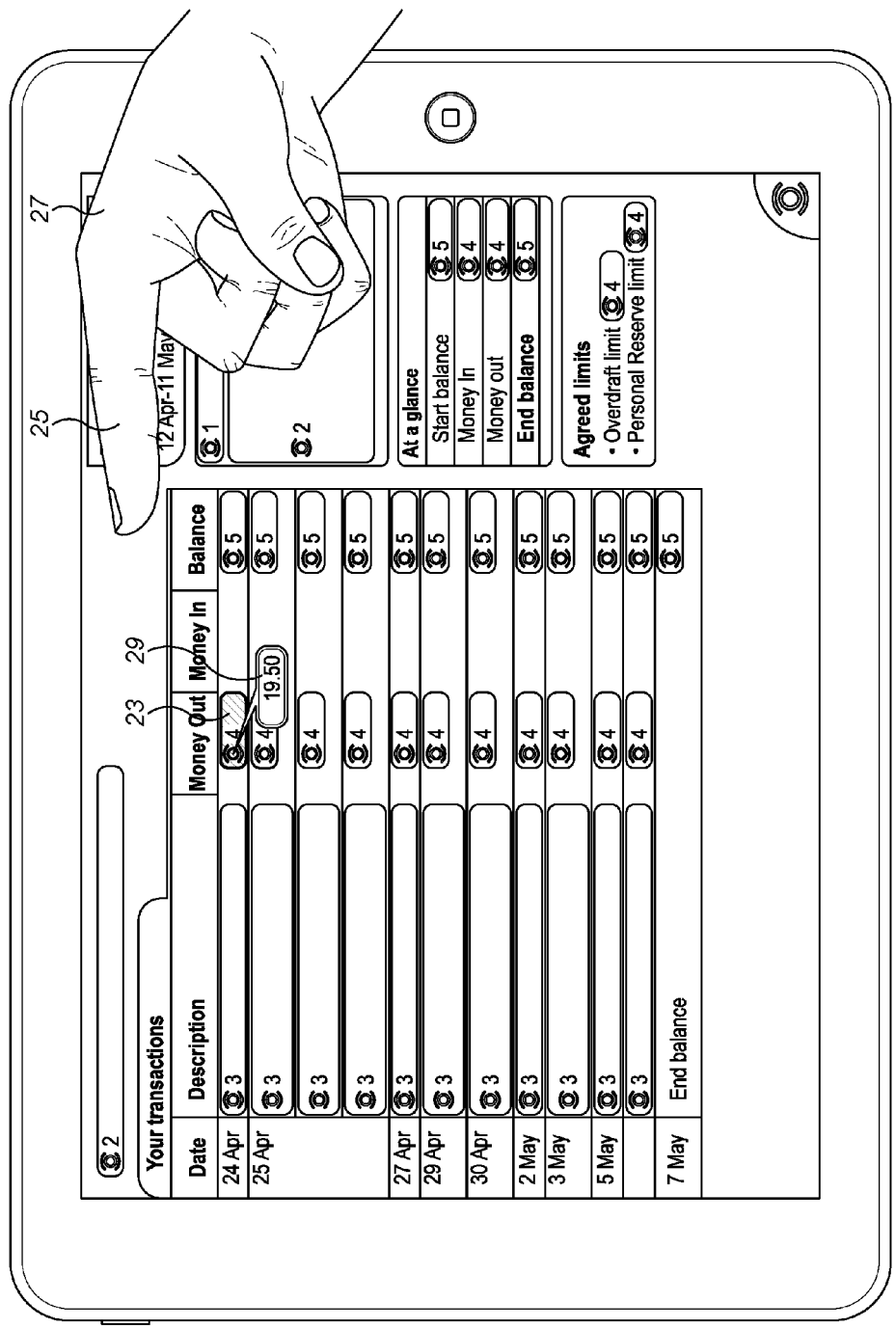

Referring to FIG. 5, the user selects information to be displayed by contacting the screen in the relevant position, using a finger or stylus. In the present embodiment, a cover is selected by touching the cover on the screen. As shown in FIG. 5, a cover is selected by a finger 25 of a right hand 27.

As shown in FIG. 5, when a cover 23 is selected, the corresponding data item is revealed and displayed, in a predetermined display format.

In more detail, sensors in the touch screen identify a contact location. The contact location is compared with the locations of the covers to identify the nearest cover in the display. The data item corresponding to the nearest cover is retrieved, and displayed at a display location, as described in more detail below.

In FIG. 5, the selected cover 23 is highlighted, and the data item is displayed at the same time, below (in the plane of the screen in the orientation being viewed) the selected cover, displayed within a rectangular label 29 with a visible link to the selected cover.

Thus, the previously covered and hidden data item is uncovered and displayed.

In the present embodiment, the location of the display of the hidden data item is predetermined. In particular, it is set to display the hidden data item below the cover and to the right hand side, using a predetermined offset. For example, the centre of the label is offset from the centre of the respective cover by a predetermined value.

Figure 8:
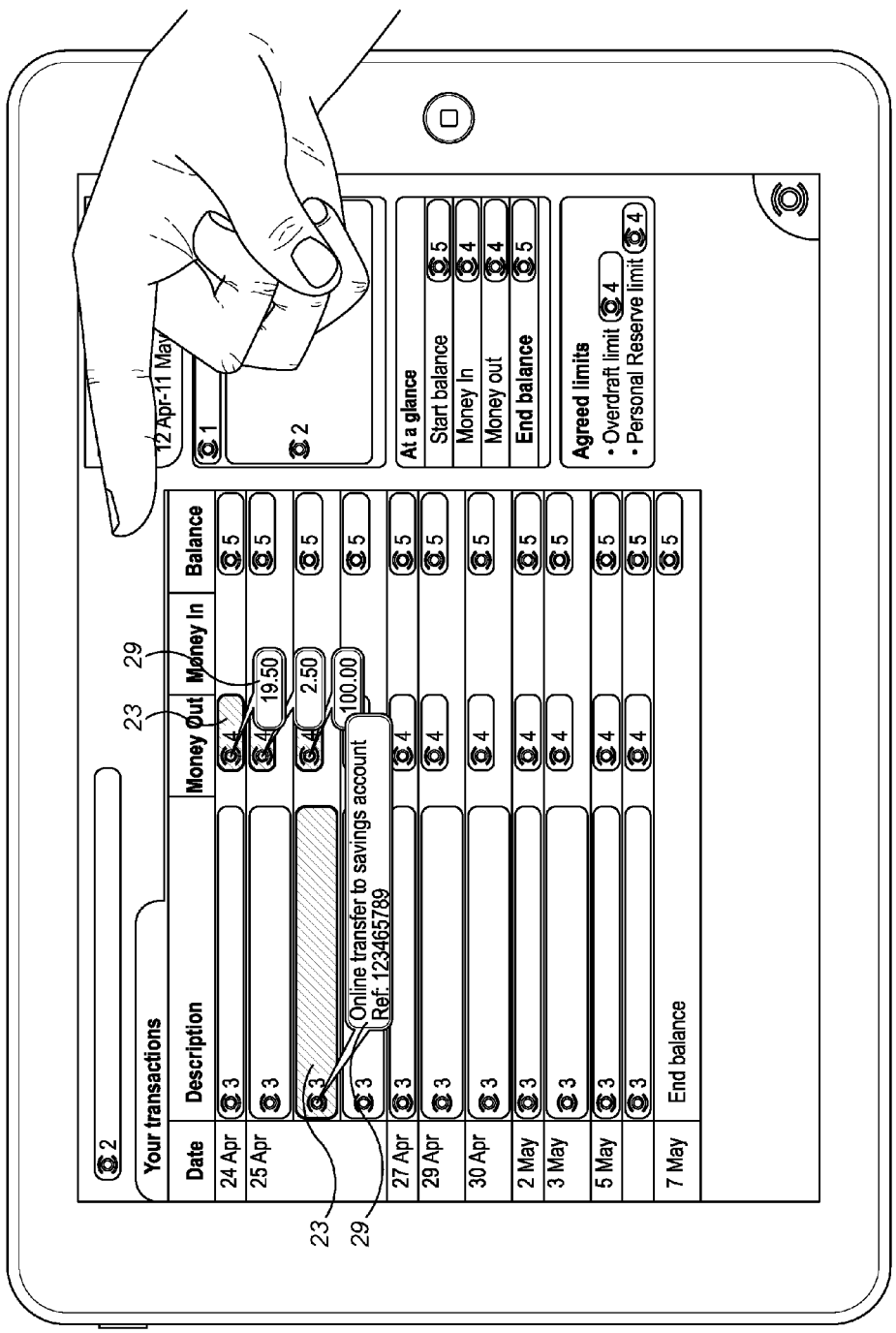
Figure 9:
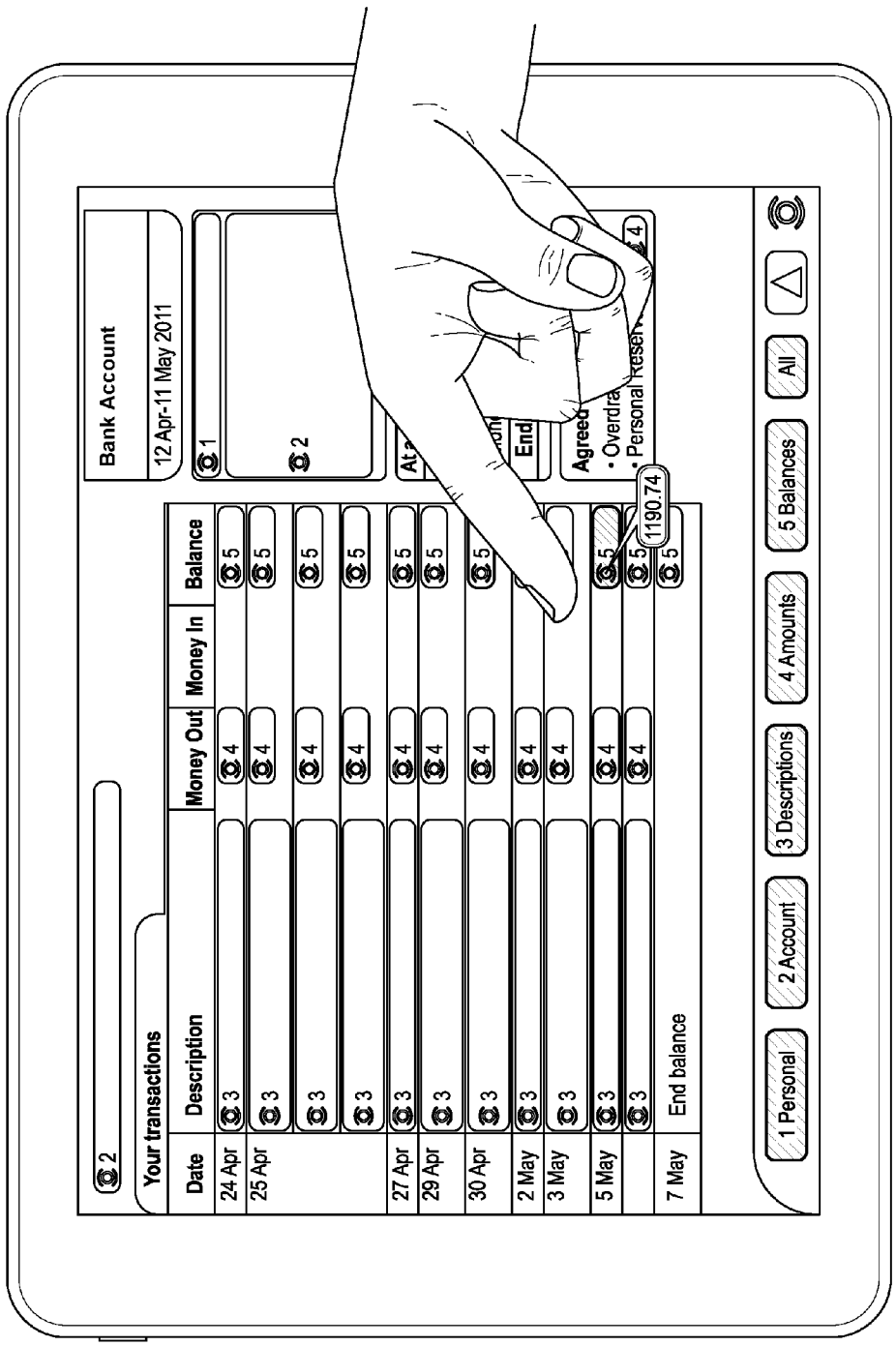
Figure 10:
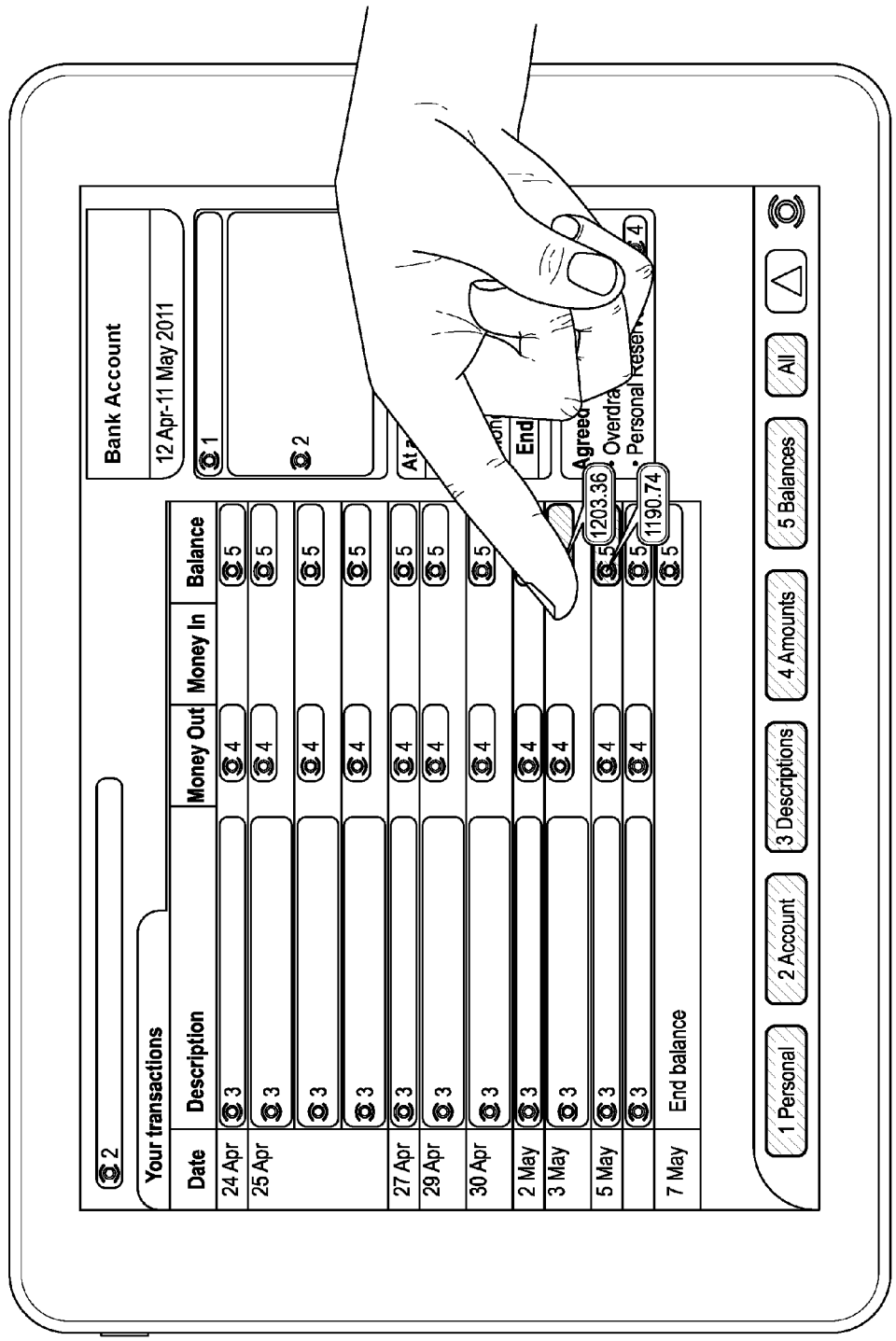

The offset is selected so that when a cover is selected and a hidden data item is displayed, the data item can be shielded by a user's hand 27. Preferably, the offset is such that, when a finger 25 contacts a cover, the displayed data item is shielded by the hand of the finger contacting the cover. Thus, the displayed data item is shifted down and to the right, with respect to the cover, for right-handed operation, that is, displayed below the finger so the hand can be used as a shade. This is illustrated in FIGS. 8 to 10, for one, two and three data items.

In FIG. 5, only the cover 23 selected by contact of the cover has the corresponding data item displayed. The other, unselected, covers remain displayed and the respective data items remain hidden and are not displayed. Thus, the user has control over what is and isn't displayed.

As long as the cover 23 is selected, the data item is displayed. After the selection, that is, contact, is removed, the data item continues to be displayed for a predetermined period of time. Alternatively, the data item can be hidden again by selecting again the cover when the data item is displayed.

Figure 6:
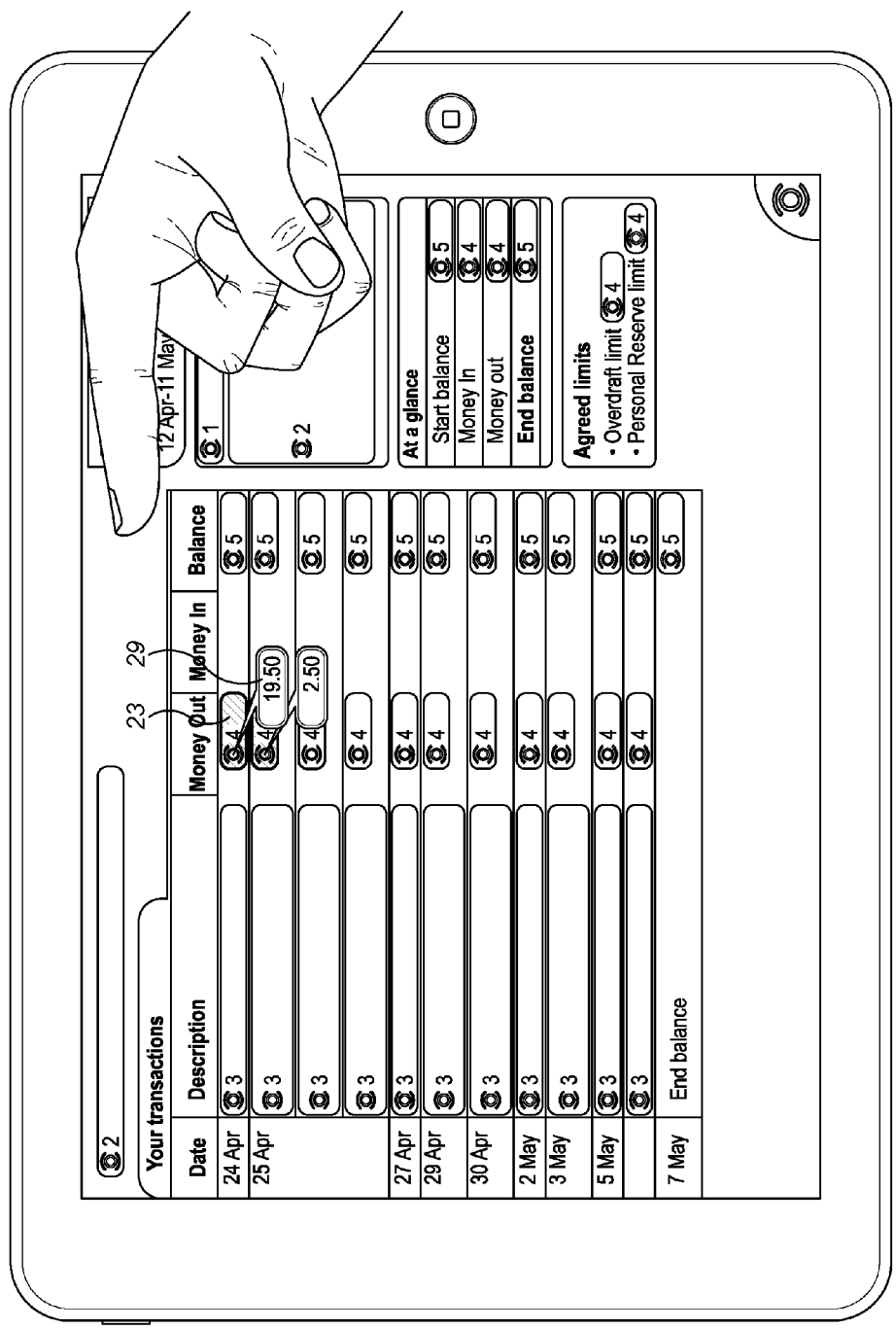
Figure 7:
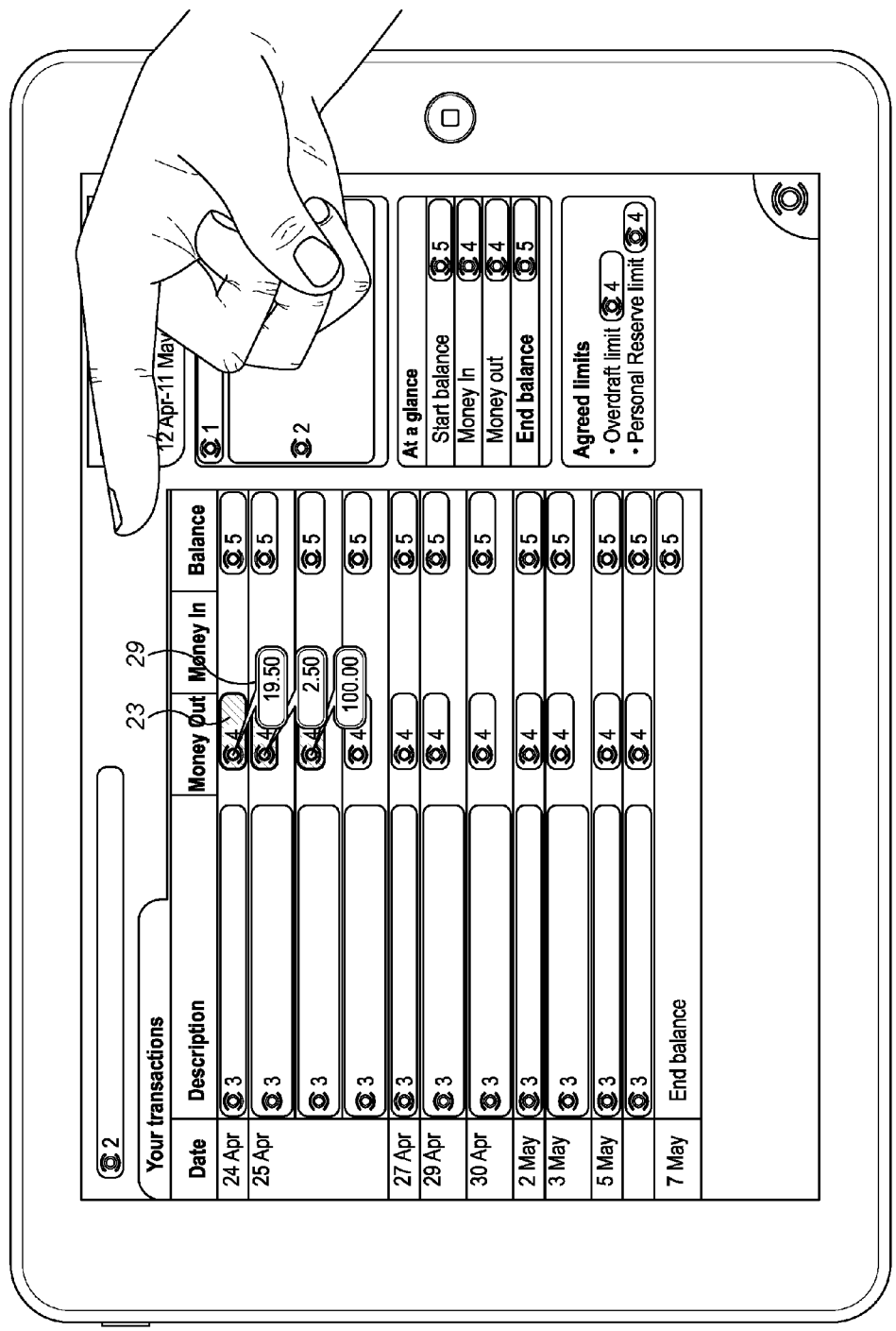

FIG. 6 shows two covers 23 selected and the corresponding data items displayed in respective labels 25, and in FIG. 7, three covers 23 are selected and the corresponding data items displayed.

In FIGS. 5 to 7, the same type of data item (amount; money out) are selected and displayed. These belong to the same category: 4 Amounts. The content (value) of the data items are different.

In FIG. 8, a further cover 23 is selected, which is a different type of data item (description), belongs to a different category: 3 Descriptions. The cover is highlighted and the data item displayed.

As shown in FIGS. 5 to 8, the covers 23 are highlighted and the data items displayed at the same time. In other words, the hidden information continues to be displayed for a certain predetermined period after selection. The predetermined period of time may be zero, that is, the hidden information is displayed only as long as there is contact, or greater than zero, which can permit multiple data items to be displayed at the same time. Other options are possible, such as displaying multiple items for the same period of time after the last item is selected. After the predetermined period has elapsed, the data items are no longer displayed and only the cover is displayed. Alternatively, the hidden information can be displayed only as long as the respective cover is selected, that is, as long as the cover is contacted by a finger or stylus or the like.

The offset is the same for all data items, but different offsets can be used.

Covers that have not been selected continue to be displayed, hiding the unselected information from view.

Figure 11:
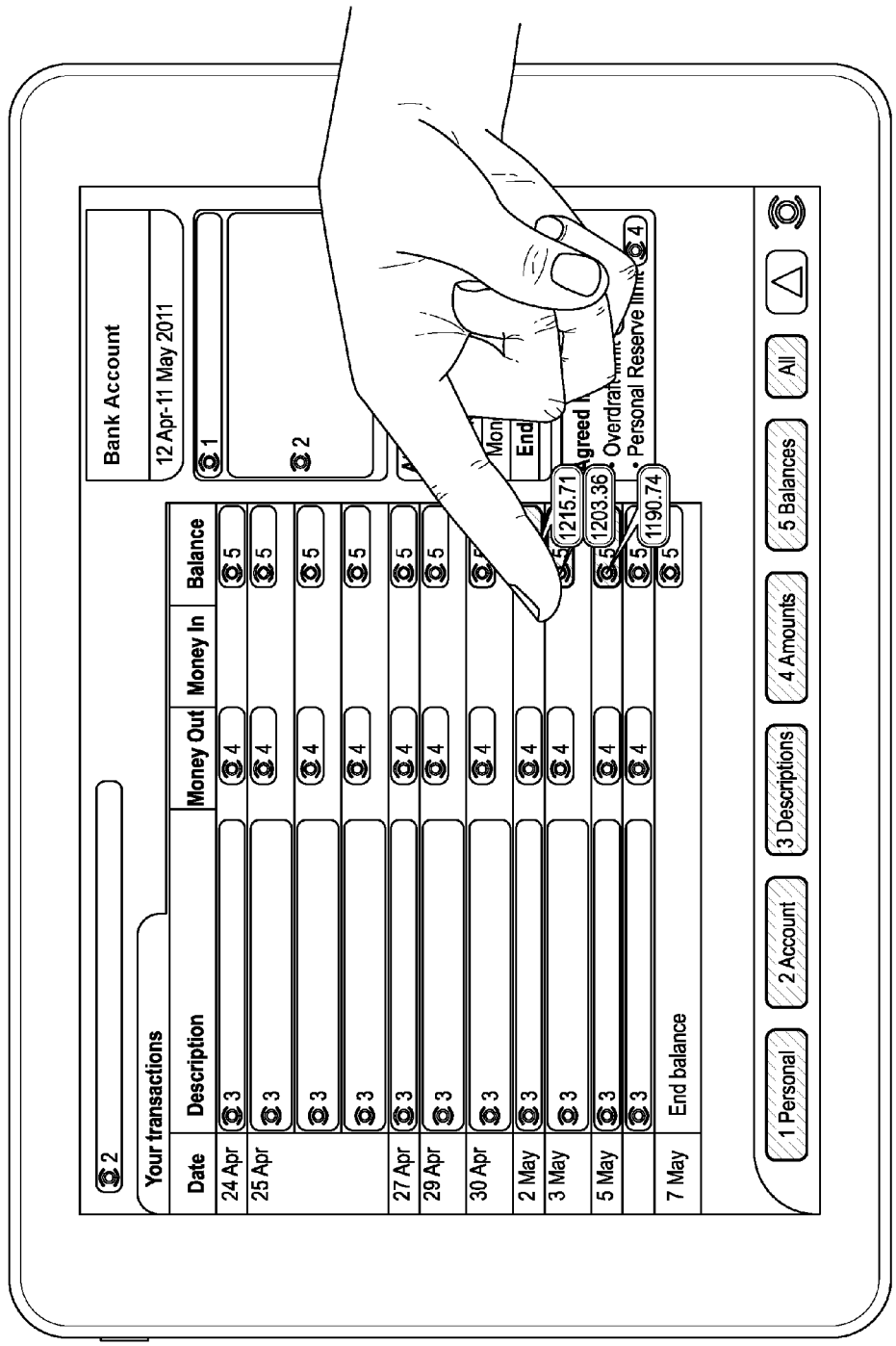

One or more data items can be selected by contact and displayed at the same time, as shown in FIGS. 9 to 11. The selecting hand can be used to shield the revealed data.

Figure 12:
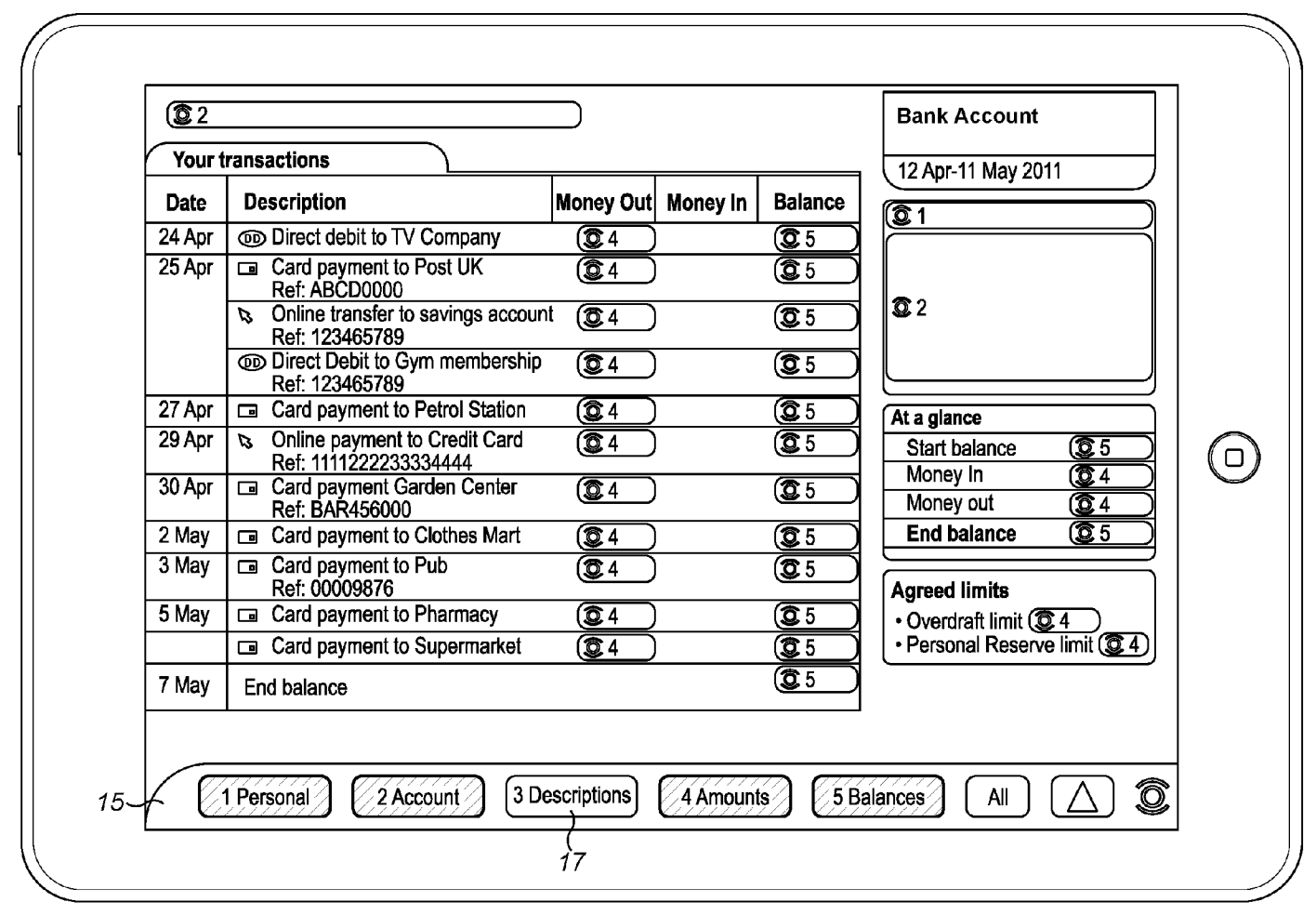

FIGS. 9 to 11 also show the menu bar 15 displayed. Using the menu bar 15, all data items in a given category can be displayed at the same time by selecting (or deselecting) a category. As shown in FIG. 12, category 3 Descriptions is selected, by contacting the button 17 in the menu bar 15, and all the covers of the description items are removed and the description items displayed. The covers for the remaining data items remain displayed, and those data items can be selectively displayed, for example, as described above.

Figure 13:
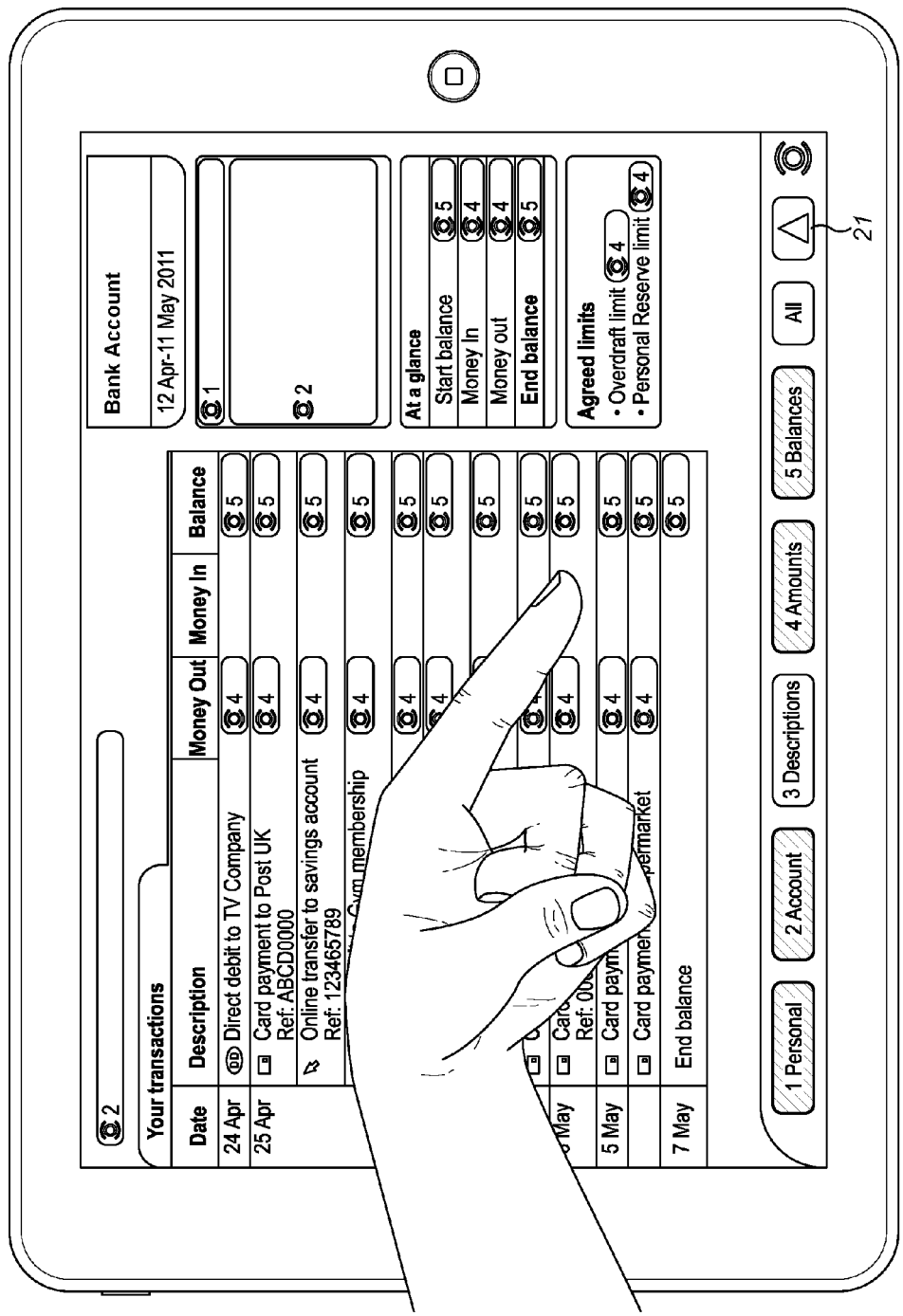
Figure 14:
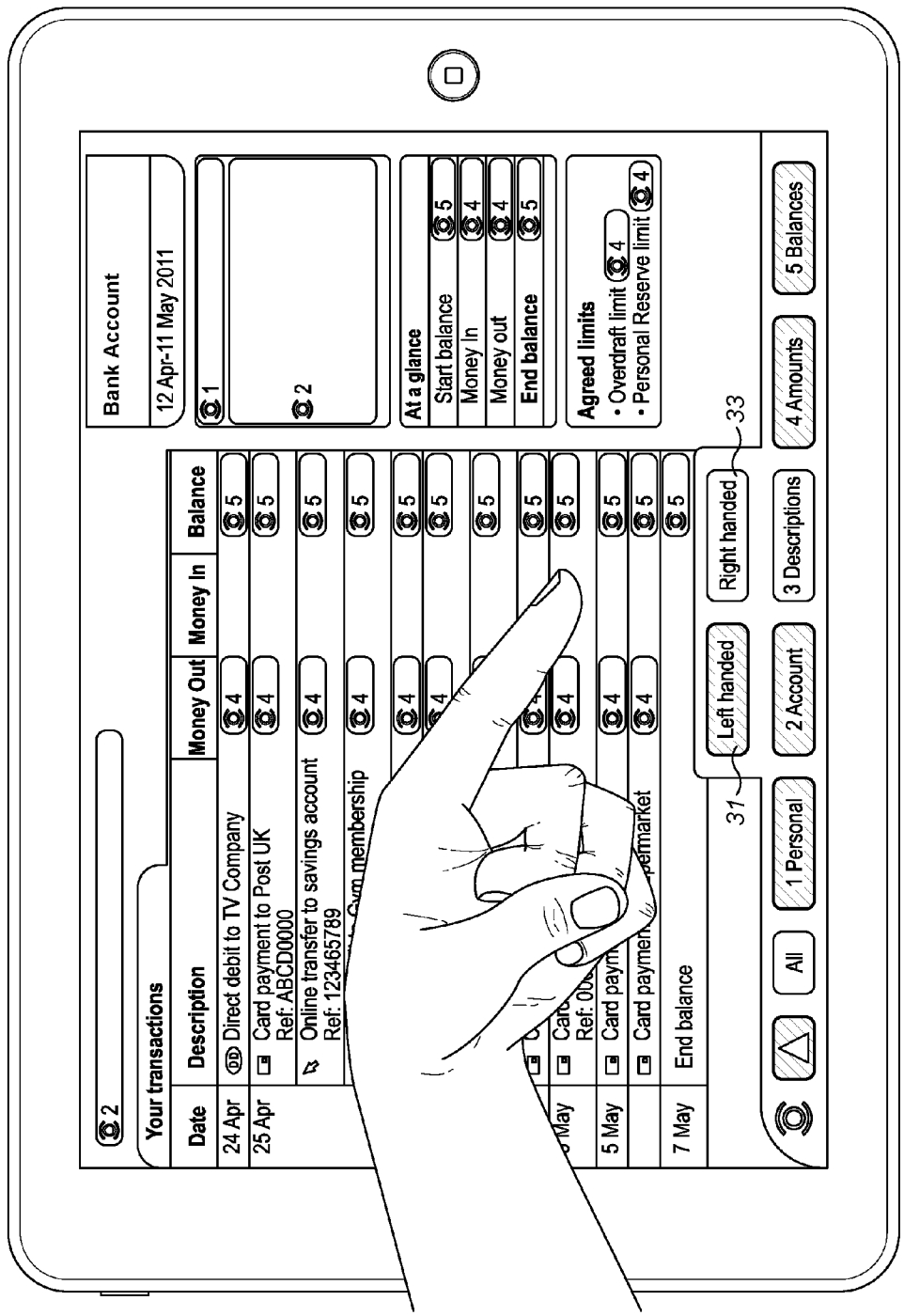
Figure 15:
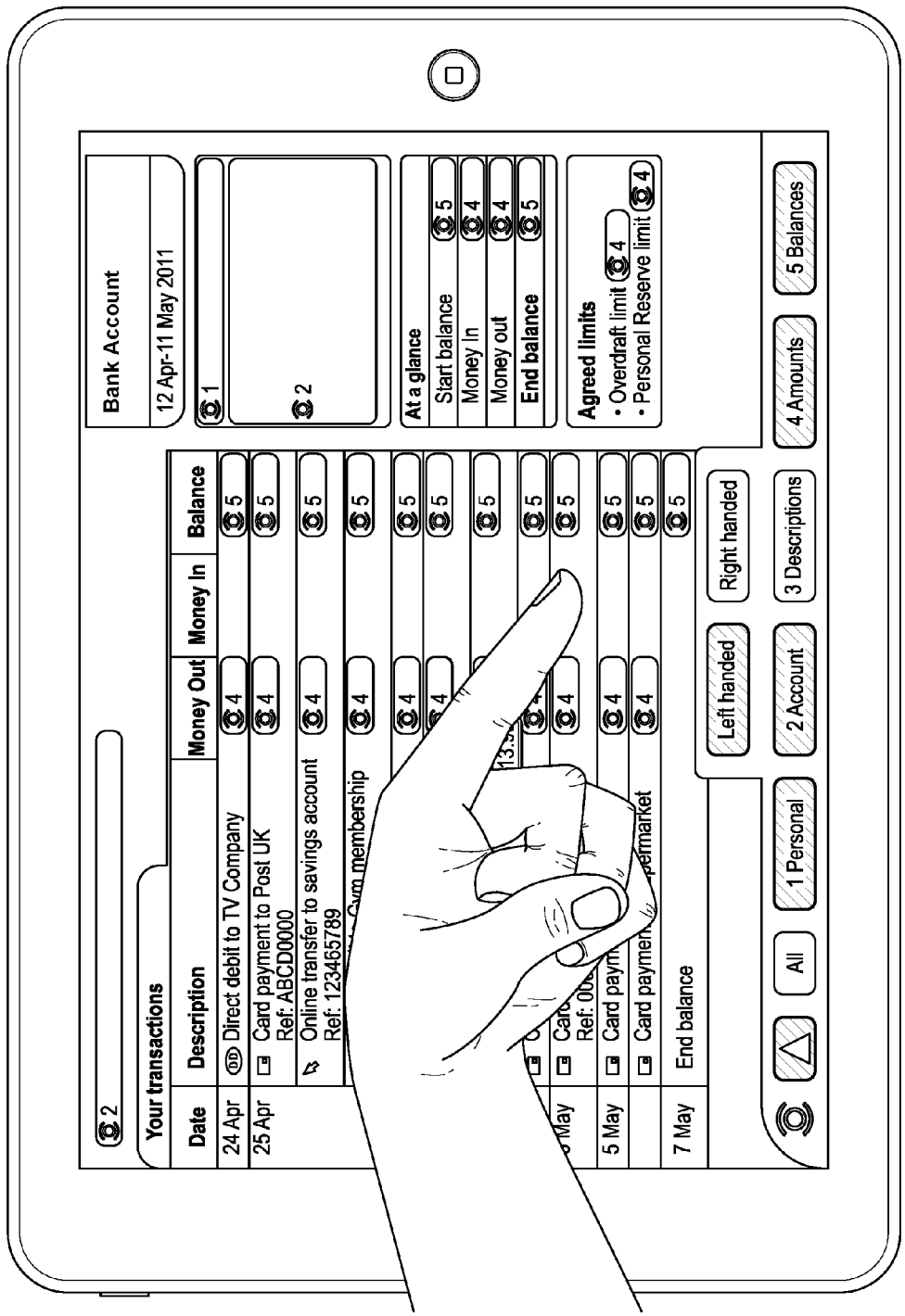
Figure 16:
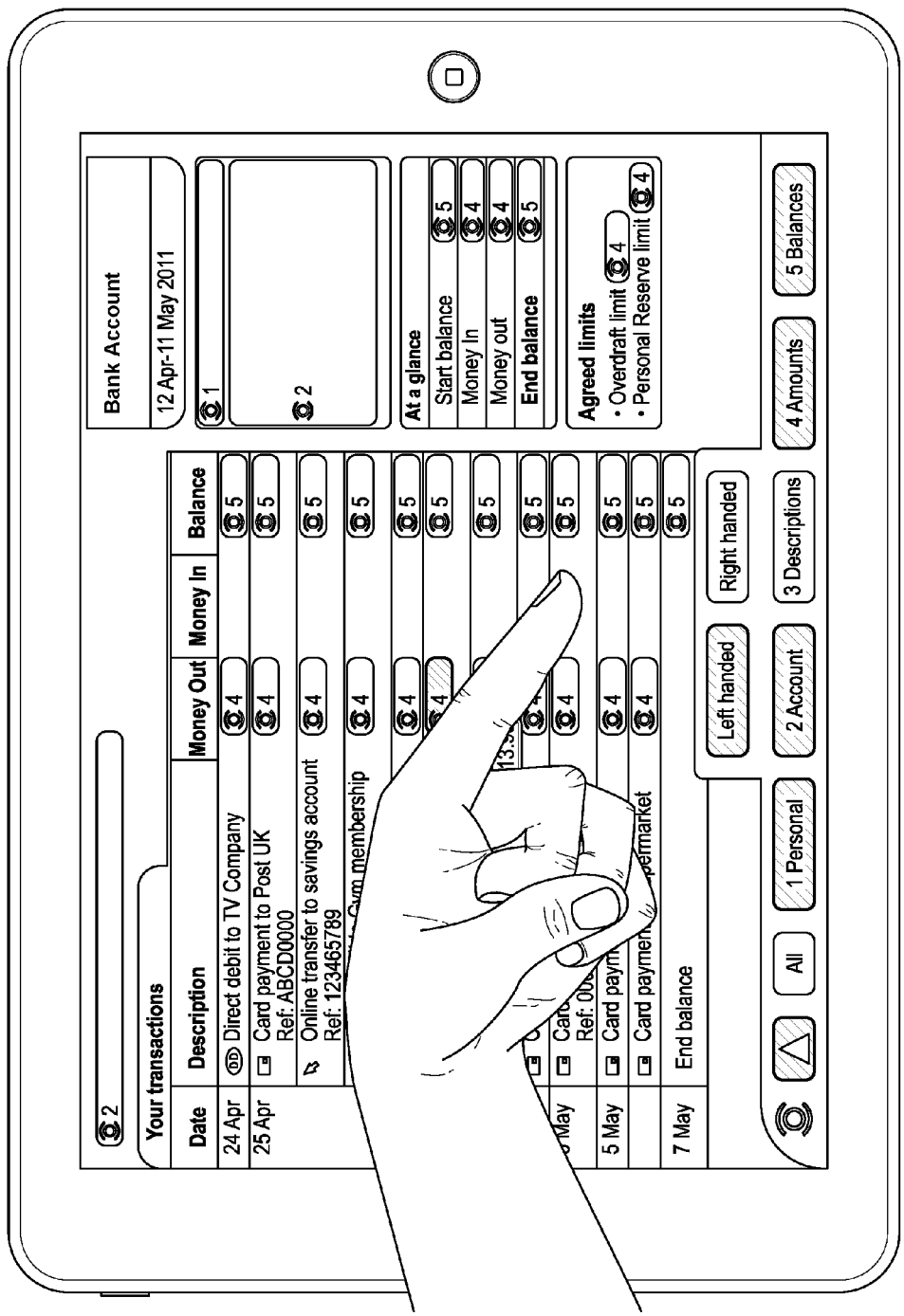
Figure 17:
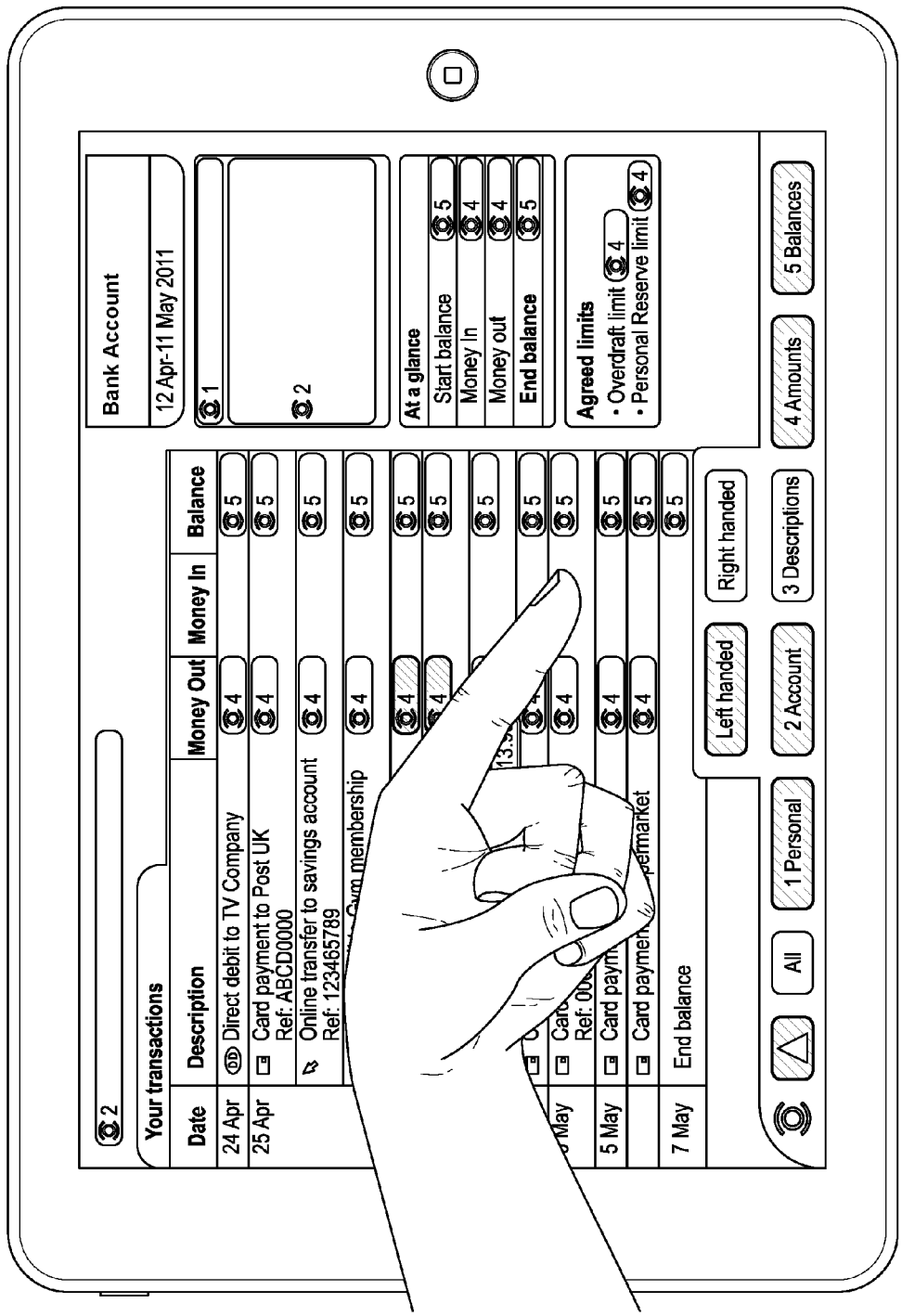

As mentioned above, the display is arranged for a right-handed person (that is, the hidden data items are displayed to be screened by a right hand selecting a cover). The device and the display can be adapted for use by a left-handed person, using an option in the menu bar, as shown in FIGS. 13 and 14. FIG. 13 corresponds to FIG. 12, and the display is arranged for a right-handed person. The left-handed person selects the options button 21, indicated by an arrow. This displays left handed and right handed option buttons 31, 33. On selection of the left handed option button 31, the buttons in the menu bar are reordered (FIG. 14) and information is displayed differently so as to be shielded by the left hand (FIG. 15). The menu button, options button and "All" button are displayed in the bottom left hand cover, and the category buttons to the right of those buttons, rather than to the left, as in the right-handed option. Also, a different offset is used. More specifically, the offset displays the information to the left hand side of the cover. Typically, the offset is the same as for the right hand option, apart from reversing the direction of the horizontal offset. FIG. 16 shows selection and display of multiple items, similar to FIGS. 6 to 8, 10 and 11 described above. Unless otherwise described, other operations in the left-handed option are as described above for the right-handed option.

Similarly, a left or right hand option can be selected depending on whether there is a person to the left or right hand side to hide information from.

Although preferably the hidden data items are displayed to be shielded by the handed selecting the respective cover, other display options are possible. For example, the data item can be displayed when the respective cover is selected by a finger of one hand, and shielded by the other hand.

In the embodiment, selected information can be viewed by the user, but shielded from others. The remaining information is covered, until selected, so that information is kept private. Accordingly viewing of all the information can be controlled to be seen only by the user.

Figure 18:
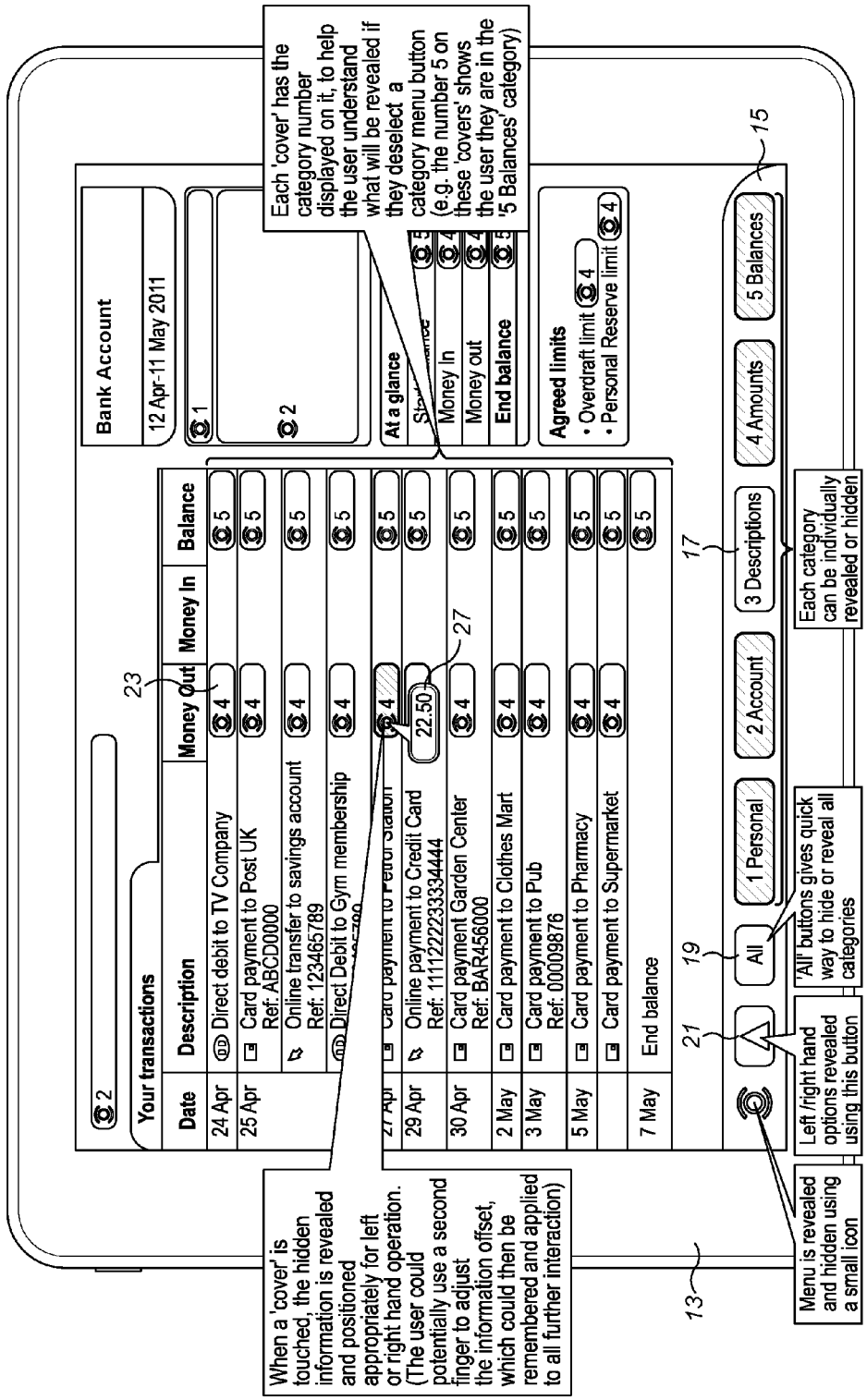

FIG. 18 illustrates elements of the display.

The menu bar 15 is revealed and hidden using a small menu icon or button 13. An options button 21 hides or reveals options including options for selecting left or right hand operation. An "All" button 19 hides or reveals the covers of all of the categories. Each category has a button 17 to reveal or hide all data items in that category.

In the menu bar 15, the borders around each button indicate if the button is "selected" or "deselected". In the embodiment, a white border (shown as light in the Figures) indicates "selected" and a blue border (shown as dark in the Figures) indicates "deselected".

In the case of the category buttons, a white border means "cover" is selected, that is, all data items in that category are covered, subject to individual selection by the user. A blue border means "cover" is deselected, that is, all data items in that category are uncovered and displayed.

In the case of the options button, a blue border means the options are not presented for selection, and a white border corresponds to selection of the options button and display of the available options. In the case of the "All" button, a white border means that all covers are displayed. A blue border means either that data items of all categories are displayed, by deselecting the "All" button, or that data items of at least one category are displayed, by selecting one of the category buttons.

Each cover 23 has a category number displayed on the cover, to help the user understand what will be revealed if a category button is deselected, or if the individual cover is selected.

When a cover 23 is touched, the hidden information is revealed and positioned appropriately for left or right hand operation.

In the embodiment, the hidden information is displayed in a label 29, and the cover and label, or data item as displayed, are essentially the same shape and size. Other display options are possible. Preferably the data item is displayed offset from the cover, but this is not essential. The data item can be displayed partially or fully superimposed on the cover, or otherwise linked or related to the cover.

In the embodiment, account information is initially transmitted and displayed as shown in FIG. 1, and all the data items are covered by selection of the "All" button, as shown in FIG. 3. Alternatively, account information can initially be displayed with all data items covered, as shown in FIG. 3.

The terms "selected" and "deselected" can be used interchangeably.

Data is transmitted and displayed using known techniques for mobile banking, such as using a website, or by using programs and data stored on the device, or a combination. Categories of data items, for including in the covers and for control of display of categories of items, may be identified, for example, from location in an array, or by metadata associated with the data items. As an example, the server may only send the selected information, that is, data item, to the device when the respective cover is selected, thus increasing security, or all data items may be transmitted to the device and only displayed when the respective cover is selected.

In the embodiment, the location, including the offset, of the information displayed when a cover is selected is predetermined. In an alternative embodiment, the location can be adjusted using a second finger of the user. In this way, the location of the displayed information can be set to be hidden by the user's hand according to the user. This offset can be saved and used and applied to future interactions.

In the embodiment, multiple items can be displayed at the same time by displaying items for a predetermined period of time after selection, or by selecting a category or categories. Other ways of displaying multiple items are possible, such as selecting multiple items by sliding a finger over the screen.

The invention can be implemented using suitable software and/or hardware form.

The invention is applicable to any software application that displays sensitive information, that a user may wish to conceal from others, on a computing device, especially a mobile and/or large screen device such as a tablet.

Although the embodiment involves a mobile computing device, the invention is not limited to mobile computing devices. The invention is also applicable to fixed devices, for example, where information is to be shielded from others nearby, such as computers in public locations such as internet cafes. Similarly, the embodiment involves a touch screen device, but the invention is not so limited. By defaulting to covering sensitive information, and selectively controlling what information is displayed, the user has more control, and limits what is displayed, which is beneficial in public locations.

The invention claimed is:

1. A method of operating a display device comprising displaying on a display device a plurality of covers representing data items in a plurality of different categories, wherein all data items in a category are selectively revealed using the covers in response to receiving user input selection of said category, wherein said data items and information identifying said categories is received by the display device from a remote location, and wherein only the data items in the selected category are transmitted from said remote location in response to receiving user input selection of said category.

2. The method of claim 1 wherein the display device is a touch screen device, and a category is selected by contact on the screen.

3. The method of claim 2 wherein the plurality of data items are displayed at the same time as the category is selected.

4. The method of claim 1 wherein a revealed data item is displayed shifted from the respective cover by an offset.

5. The method of claim 4 wherein the offset is predetermined.

6. The method of claim 4 wherein the offset size and/or direction is adjustable.

7. The method of claim 4 wherein an option is provided to select offset to the left or right hand side.

8. The method of claim 4 wherein the offset size and/or distribution is adjustable by screen contact.

9. The method of claim 1 comprising determining a layout for display of data items, displaying covers in said layout corresponding to said data items, and displaying the data item or items when a respective cover is selected.

10. The method of claim 1 comprising displaying a plurality of input elements associated with a respective plurality of user-selectable categories, sensing a selection location of a selecting device by sensing contact on the screen, determining the nearest input element in the display to the selection location, determining the corresponding data items in the user-selected category, determining a plurality of display locations, and displaying the data items on a display at the determined display locations.

11. The method of claim 1 wherein said data items relate to financial information.

12. The method of claim 1 wherein the display device is a mobile device.

13. Apparatus comprising means for executing the method of claim 1.

14. The method of claim 11, wherein said data items relate to bank account statement information.

15. A computer program comprising computer-executable steps to execute the method of claim 1.

16. A display device comprising one or more hardware processors configured to:
    display a plurality of covers representing data items in a plurality of different categories;
    selectively displaying all covered data items in a category in response to user input selection of said category; and
    receive said data items and information identifying said categories from a remote location, wherein only the data items in a selected category are transmitted from said remote location in response to receiving user input selection of said category.

* * * * *